United States Patent [19]

Dias et al.

[11] Patent Number: 5,805,785
[45] Date of Patent: Sep. 8, 1998

[54] METHOD FOR MONITORING AND RECOVERY OF SUBSYSTEMS IN A DISTRIBUTED/CLUSTERED SYSTEM

[75] Inventors: Daniel Manuel Dias, Mahopac; Richard Pervin King, Thornwood; Avraham Leff, Spring Valley, all of N.Y.

[73] Assignee: International Business Machines Corporation, Armonk, N.Y.

[21] Appl. No.: 606,765

[22] Filed: Feb. 27, 1996

[51] Int. Cl.$^6$ ........................................... G06F 11/00
[52] U.S. Cl. .................... 395/182.02; 395/182.18
[58] Field of Search ................ 395/182.02, 182.18, 395/182.13, 182.14, 200.13, 200.18, 200.2, 575, 182.1, 183.15, 184.01, 185.01, 185.04, 700, 600, 427, 703, 500, 680, 670, 650

[56] References Cited

U.S. PATENT DOCUMENTS

| | | | |
|---|---|---|---|
| Re. 34,100 | 10/1992 | Hartness | 371/40.1 |
| 4,480,304 | 10/1984 | Carr et al. | 364/200 |
| 4,627,055 | 12/1986 | Mori et al. | 371/16 |
| 4,807,224 | 2/1989 | Naron et al. | 370/94 |
| 4,945,474 | 7/1990 | Elliot et al. | 364/200 |
| 4,984,240 | 1/1991 | Keren-Zvi et al. | 371/8.2 |
| 5,084,816 | 1/1992 | Boese et al. | 395/575 |
| 5,243,601 | 9/1993 | Tague et al. | 371/16.1 |
| 5,258,984 | 11/1993 | Menon et al. | 371/10.1 |
| 5,295,258 | 3/1994 | Jewett et al. | 395/575 |
| 5,307,354 | 4/1994 | Crammer et al. | 371/11.2 |
| 5,333,308 | 7/1994 | Ananthanpillai | 395/575 |
| 5,333,314 | 7/1994 | Masai et al. | 395/600 |
| 5,349,662 | 9/1994 | Johnson et al. | 395/700 |
| 5,355,484 | 10/1994 | Record et al. | 395/650 |
| 5,408,649 | 4/1995 | Beshears et al. | 395/575 |
| 5,440,726 | 8/1995 | Fuchs et al. | 395/182.18 |
| 5,440,741 | 8/1995 | Morales et al. | 395/650 |
| 5,475,839 | 12/1995 | Watson et al. | 395/650 |
| 5,528,750 | 6/1996 | Lubart et al. | 395/182.13 |
| 5,592,664 | 1/1997 | Starkey | 395/600 |
| 5,608,908 | 3/1997 | Barghouti et al. | 395/703 |
| 5,621,892 | 4/1997 | Cook | 395/200.1 |
| 5,625,821 | 4/1997 | Record et al. | 395/670 |
| 5,630,047 | 5/1997 | Wang | 395/182.13 |

*Primary Examiner*—Robert W. Beausoliel, Jr.
*Assistant Examiner*—Nadeem Iqbal
*Attorney, Agent, or Firm*—Whitham, Curtis & Whitham; Kevin Jordan

[57] ABSTRACT

A system and method for a general and extensible infrastructure providing monitoring and recovery of interdependent systems in a distributed/clustered system is disclosed. Subsystems, built without provision for high availability, are incorporated into the infrastructure without modification to core subsystem function. The infrastructure is comprised of one or more computing nodes connected by one or more interconnection networks, and running one or more distributed subsystems. The infrastructure monitors the computing nodes using one or more heartbeat and membership protocols, and monitors the said distributed subsystems by subsystem-specific monitors. Events detected by monitors are sent to event handlers. Event handlers process events by filtering them through activities such as event correlation, removal of duplicates, and rollup. Filtered events are given by Event Managers to Recovery Drivers which determine the recovery program corresponding to the event, and executing the recovery program or set of recovery actions by coordination among the recovery managers. Given failures of said event handlers or recovery managers, the infrastructure performs the additional steps of: coordinating among remaining event handlers and recovery managers to handle completion or termination of ongoing recovery actions, discovering the current state of the system by resetting the said monitors, and handling any new failure events that may have occurred in the interim.

12 Claims, 7 Drawing Sheets

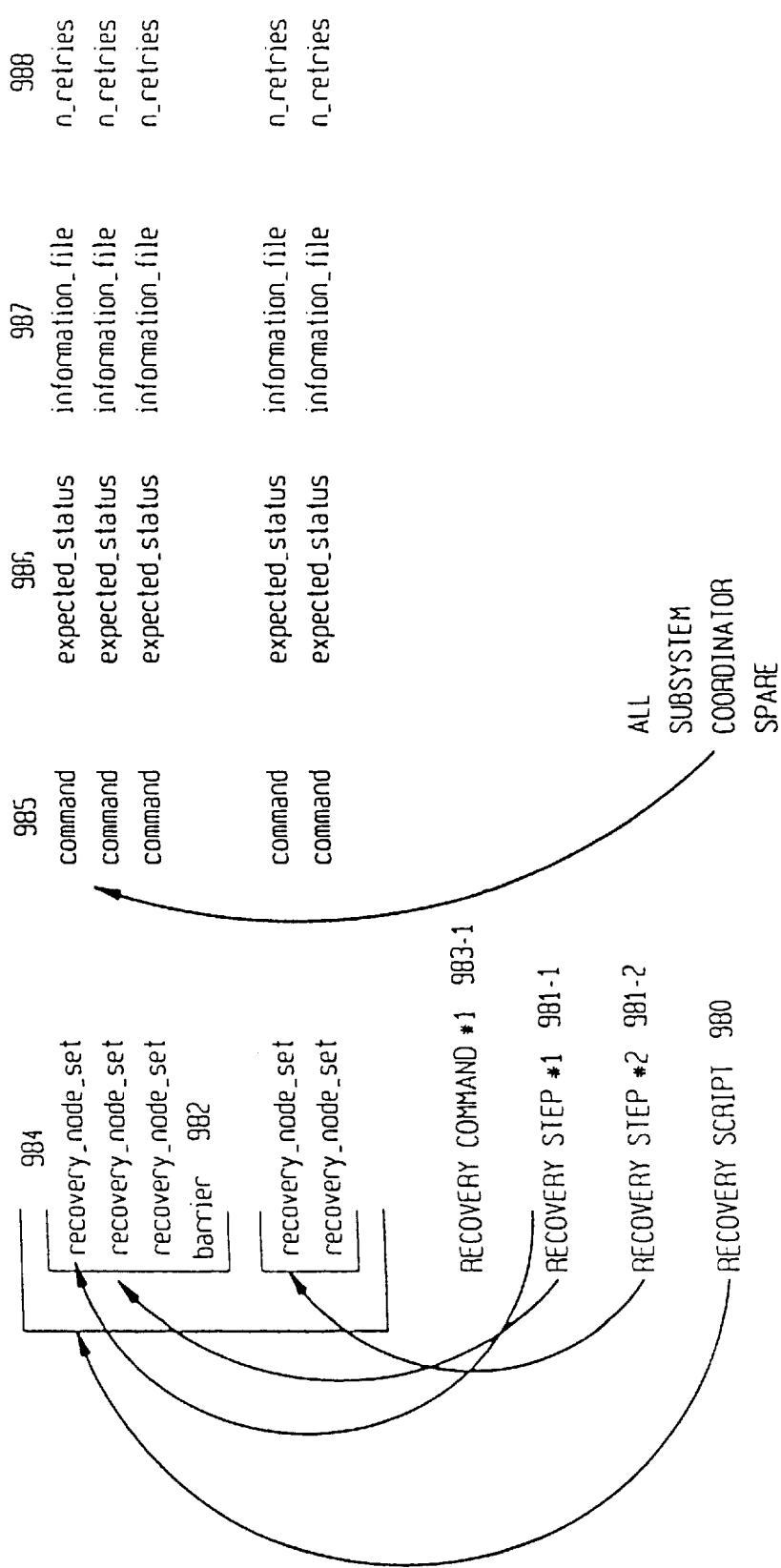

METHOD FOR MONITORING AND RECOVERY OF SUBSYSTEMS IN A DISTRIBUTED/CLUSTERED SYSTEM

I. BACKGROUND OF THE INVENTION a. Field of the Invention

This invention relates generally to distributed or clustered systems. More particularly, this invention relates to providing high availability to a set of interdependent subsystems in a distributed or clustered system.

b. Related Art

With the explosive growth of interest and applications on the World Wide Web (WWW) and the Internet, popular sites on the net are experiencing exponential growth in the request rate. Similarly, due to their increased popularity, applications such as On-Line Database Transaction Processing (OLTP), both for WWW back-end applications, and for more traditional applications, require high transaction rates on the order of thousands of transactions per second. In many environments these applications also require high availability, so that the applications are essentially continuously available.

The high request rates that need to be supported can be provided for on a clustered or distributed system architected as a set of computing nodes connected by an interconnection network. A set of interdependent software components typically run on the cluster. For example, for a WWW-based OLTP application, the software elements can include a load-balancing router and domain name server, web (HTTP) daemons on the nodes, a shared file system (e.g. AFS), a transaction monitor (e.g. CICS), a parallel database (e.g. DB2PE), Virtual Shared Disk, the Operating System (e.g. AIX), the switch subsystem or interconnection network, and the physical nodes.

In order to maintain high availability, failure events need to be detected. In order to recover, the system needs to be reconfigured and recovery among the system elements needs to be coordinated. One problem with achieving high availability is that the type of failures that can occur and the potential methods for detection and recovery can be quite varied. Thus, there is a need for a high availability infrastructure that can provide detection for general failure events and can drive recovery of the interdependent software elements.

In the IBM Highly Available Cluster Multi-Processor (HACMP) system, five specific failure events are defined and detected. Responsive to each of these events, two system-wide synchronization points are defined, with the capability of running user-specified scripts at each of these synchronization points.

In the IBM Automatic Restart manager (ARM), Units of Work (UOW) that are run on a computing node are defined. Unexpected termination of a UOW is detected, or failure of the node on which the UOW is running is detected. Responsive to these detected events, the UOW is restarted either on the failed node or on another node in the system.

One problem with HACMP and with ARM is that the methods used are tied to prespecified failure events. The methods used in HACMP and ARM do not generalize to arbitrary or open-ended failure events. Furthermore, in both HACMP and ARM, the recovery methods used for the pre-specified failure events are rather restrictive. In ARM it is restricted to restarting the UOW. In HACMP it is restricted to steps on all the nodes in the system separated by two pre-defined barriers.

Much of the prior art in the area of providing high availability is directed to specific applications or particular subsystems that are made highly available in a specific, predetermined manner. While some systems provide a more general solution, they typically do not provide for the detection or recovery from failures in interdependent software subsystems in clustered or distributed systems.

II. SUMMARY OF THE INVENTION

It is an object of this invention to provide a general and extensible infrastructure that provides detection of and recovery from open-ended, user defined failure events occurring in interdependent subsystems in a distributed or clustered system.

In view of the above, a system and method are provided for monitoring and recovery of subsystems in a distributed system. In accordance with an aspect of the present invention, a distributed software subsystem is executed on the distributed system. Monitors, each including a set of user defined events to be detected, are provided for the software subsystem. Responsive to an occurrence of one of the events, coordinated recovery actions are performed under control of a user specified recovery program.

In a preferred embodiment, monitors are provided for the computing nodes using one or more heartbeat and membership protocols. User defined monitors are also provided for software subsystems running on the computing nodes. Events detected by monitors are sent to event handlers. The event handlers process events by filtering them through such activities as event correlation, removal of duplicate events, and rollup. Filtered events are given by event handlers to recovery drivers, which have a rule base which specifies user defined recovery programs corresponding to the events. The recovery programs are composed of recovery steps which specify the set of nodes on which they run, the action to be performed, the maximum time that the action can take, the actions to be taken in the event that the recovery step fails, and parameters required for the recovery step. The recovery programs also specify which sets of recovery steps can be carried out in parallel, i.e. simultaneously. The recovery steps are interspersed by user defined barrier commands that require that all the prior recovery steps be completed before proceeding beyond the barrier. The recovery drivers coordinate among the nodes in the clustered/distributed system to execute the recovery program.

Advantageously, in the preferred embodiment, the present recovery system and method also handles failure of the event handlers or recovery drivers. Given failure of said event handlers or recovery managers, the infrastructure performs the additional steps of coordinating among the remaining event handlers and recovery managers to handle completion or termination of ongoing recovery actions, discovering the current state of the system by resetting the said monitors, and handling any new failure events that may have occurred in the interim. Also, advantageously, the present system can incorporate subsystems built without provision for high availability into the high availability infrastructure without modification to the core subsystem function.

III. BRIEF DESCRIPTION OF THE DRAWINGS

The present invention will be better understood by reference to the appended drawings in which.

IV. DETAILED DESCRIPTION OF A PREFERRED EMBODIMENT

Figure 1:
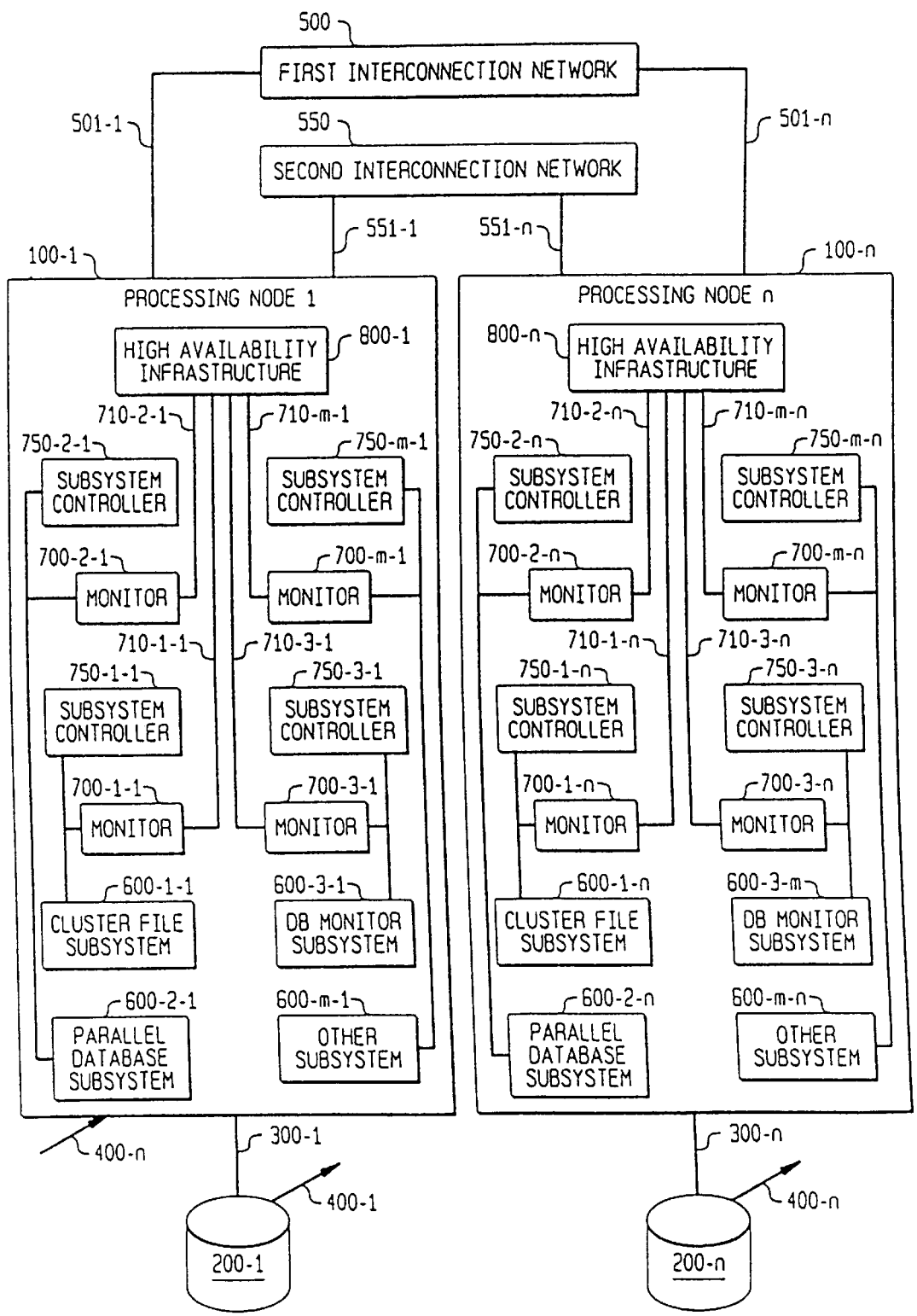
FIG. 1 is an overall block diagram of a preferred embodiment of the invention, and shows the hardware and software components that underly the highly available system (HAV) infrastructure.

FIG. 1 is a block diagram of a preferred embodiment of this invention, which incorporates the infrastructure for building a highly available system, henceforth referred to as HAV. The overall system includes a set of computing nodes 100-1 through 100-n, that are connected by two interconnection networks 500 and 550. Those skilled in the art will readily appreciate that the method described herein is easily generalized to an arbitrary number of interconnection networks between the nodes. Each computing node 100-1 through 100-n is connected to a disk subsystem, 200-1 through 200-n respectively, through a set of primary links 300-1 through 300-n respectively. Each disk subsystem may contain an arbitrary number of disks, and each primary link may consist of several physical links or buses. Each disk subsystem 200-1 through 200-n is also connected to one (or more) additional node, via secondary links 400-1 through 400-n. Those skilled in the art will readily appreciate that the method described herein is easily generalized to an arbitrary number of tails and nodes that each disk subsystem may connect to.

FIG. 1 also shows the distributed software components that run on each of the nodes 100-1 through 100-n. Those of skill in the art will understand that each of the below-described software components can be embodied as program code instantiated in the node's main memory or disk storage. There are interdependent software subsystems 600-1 through 600-m running on the nodes, and each subsystem 600-k has instances 600-k-1 through 600-k-n, where k is any positive integer, running on nodes 100-1 through 100-n respectively. In the example shown in FIG. 1, subsystem 600-1 is a cluster file system, 600-2 is a parallel database system that runs on the file system, 600-3 is a transaction monitor that depends on the database system and 600-4 is a generic subsystem that could be of any type. In this example, the database system 600-2 has instances 600-2-1 through 600-2-m running on each of the nodes, and similarly for the other subsystems. Recoverable failure of any instance of any subsystem triggers recovery actions which are taken for the other instances of that subsystem and also for subsystems that interact with or depend on that subsystem.

Going back to FIG. 1, each subsystem instance 600-k-i of subsystem 600-k running on node 100-i has one (or more) monitor(s) 700-k-i and a subsystem controller 750-k-i (where $1 \leq i \leq n$). Those skilled in the art will readily appreciate that this is easily generalized to an arbitrary number of monitors per subsystem instance. The monitors are user defined and probe the health of the associated subsystem instance. For example, a monitor could detect if a process in a subsystem failed, or it could monitor a log of a subsystem to determine if a failure occurred, or it could exchange messages or heartbeat with a subsystem process(es), or make calls to the subsystem to determine if the subsystem is running normally. The user can be, for example, a system administrator, a developer or provider of HAV programs. For example, in the case of a DB2 Parallel Edition (DB2PE) subsystem, a user can write a script that associates named instances with their process id and loads the information into a process monitor. The monitor checks the health of the set of process ids that it has been provided with, and when it detects that a given process has failed, informs the event manager that a DB2PE instance (with given id) has entered the detected state.

When a monitor 700-k-i detects (user defined) failure events, it informs the high availability infrastructure (HAV) 800-i on node 100-i over a (logical) link 710-k-i about the failure event. On receiving failure events from the monitors, on the links 710-k-i, HAV 800-i on the corresponding node 100-i coordinates with the instances of HAV 800-1 through 800-n, to drive coordinated recovery of the subsystems 600-1 through 600-m.

Figure 2:
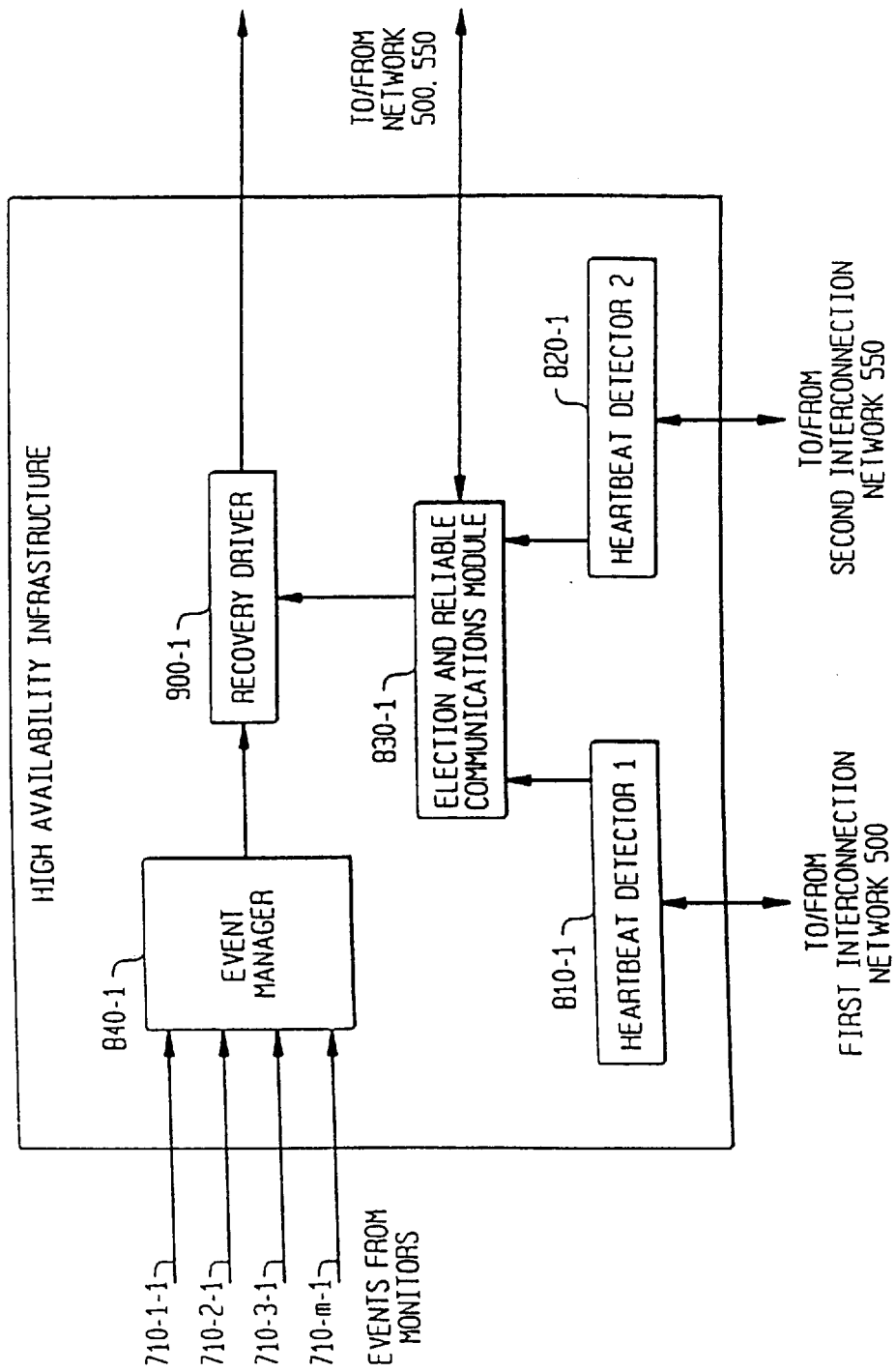
FIG. 2 is a more detailed block diagram of the components that comprise the HAV infrastructure.

The components of the high availability infrastructure (HAV), 800-1 through 800-n, are shown in FIG. 2. A set of heartbeat processes 810-1 through 810-n run on each of the nodes 100-1 through 100-n respectively, which send messages among themselves on network 500, to determine whether nodes 100-1 through 100-n are in a group that can communicate on first network 500. Similarly, heartbeat processes 820-1 through 820-n do the same for the second network 550. Those skilled in the art will readily appreciate that heartbeat and group membership protocols (e.g. F. Jehanian, S. Fakhouri, and R. Rajkumar, "Processor Group Membership Protocols: Specification, Design and Implementation, Proc. 12th Symposium on Reliable Distributed Systems, pp. 2–11, Princeton, N.J., October 1993, IEEE Computer Society Press) known in the art can be used for this purpose. As detailed below, a distributed component that provides election and reliable communications 830-1 through 830-n uses the data provided by the dual heartbeats 810 and 820 in order to elect a coordinator node 100-c from the nodes 100-1 through 100-n in the cluster, and also provides reliable communication within the cluster through the coordinator node. An event manager component with instances 840-1 through 840-n gets events from the monitors 700-i-k, over corresponding links 710-i-k, $1 \leq i \leq m$, $1 \leq k \leq n$. The event manager is responsible for eliminating duplicate events and rolling up interdependent events, as detailed below. The event manager reports the events that have not been eliminated to the recovery manager 900, which has instances 900-1 through 900-n running on nodes 100-1 through 100-n respectively. As detailed below, the recovery manager 900 uses user-defined recovery programs and, through a recovery coordinator, elected using the election component 830, drives coordinated recovery, by communicating recovery commands among the nodes via the ERCM 830.

Figure 3:
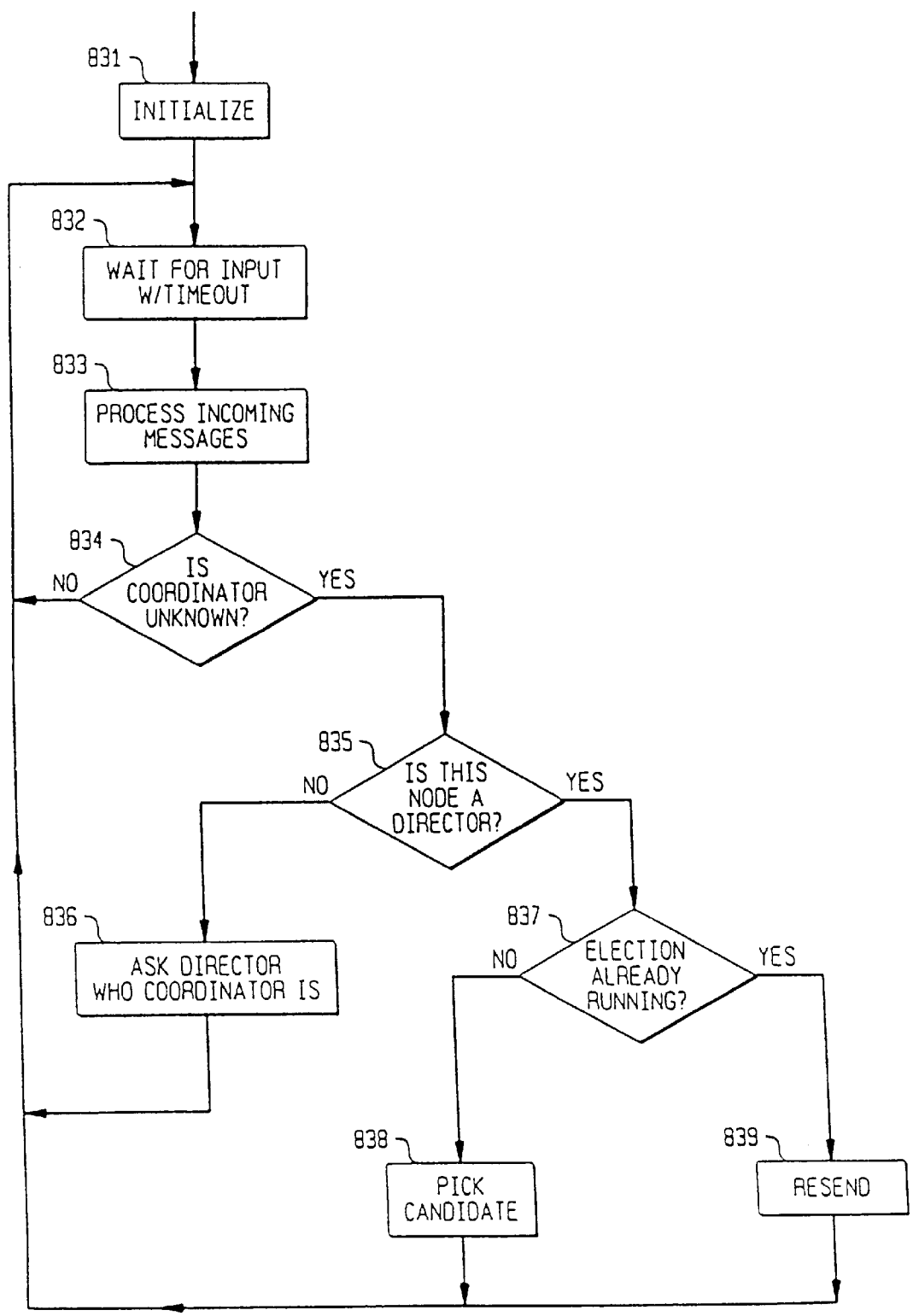
FIG. 3 is a flow chart showing the steps involved in electing an HAV coordinator and in performing communication reliably among HAV components running on different nodes.

The process for providing election of a coordinator and reliable communication is illustrated in the flow diagram of FIG. 3, to which reference is now made. Election is performed by an Election and Reliable Communications Module (ERCM) 830-1, which is a software process running on each of the nodes 100-1 to 100-n. All instances of the ERCM communicate with one another by exchanging datagrams by way of either or both of the interconnection networks 500, 550.

Define a quorum on a given network (network 500 or network 550) as being any set of more than n/2 nodes. Whenever there is a quorum on a particular network, there is also what will be referredto as a director, which is the highest numbered node currently up and running on that network. With two networks, there may be two directors. The higher numbered director of the two will be called the chairman. The process of election in each ERCM is initialized in block 831 by setting to UNKNOWN its record of which node is currently the coordinator. Entry is then made to the main loop, starting with block 832, wherein the election process of the ERCM instance waits for any incoming message to arrive from another election process (executed by another ERCM instance on another node), but only for a limited amount of time. This time limit is determined by a trade-off between the cost of having excess, unnecessary processing when the time limit is short versus the delay in starting an election arising from a long time limit, where 5 seconds can be regarded as a typical value.

Processing continues in block 833, with the processing of all messages that have just arrived. To handle each type of incoming message, each election process in each ERCM does the following, based on the message type indicator included in the message (where the message type indicators are in caps):

PREPARE: mark coordinator as unknown, then answer:
  ACCEPTANCE: if the PREPARE came from a director not known to be impaired (an impaired director is one which is only up and running on one network 500, 550 but not both);
  WAIT-FOR-COMMIT: if the PREPARE came from the non-chairman while there is an impaired chairman;
  WAIT-FOR-PREPARED: if the PREPARE came from an impaired chairman. Also send a PREPARE-FOR-CHAIR message to the non-chairman.

The sender of WAIT-FOR-COMMIT or WAIT-FOR-PREPARED may need to change the candidate on behalf of the director. The PREPARE message from each director includes a choice of candidate. The candidate may need to be changed when the director is on only one network, in which case it may have chosen as candidate a node not on both networks 500, 550. Seeing this, a node that is on both networks sends back a corrected choice of candidate appended to its reply message. The correct choice is the lowest numbered node known to be up and running on both networks. Specifically, the response to the PREPARE is as follows (with the new candidate choice, if any, appended):

ACCEPTANCE: note answerer as having answered. Once all answers have been received, do the commit processing, which is to mark the election as over with the candidate being the new coordinator and to send COMMIT messages to all reachable nodes;
WAIT-FOR-COMMIT: note answer, commit if appropriate, and note the need to receive a COMMIT message before doing commit processing;
WAIT-FOR-PREPARED: note answer, commit if appropriate, and note the need to receive a PREPARED message before doing commit processing;
PREPARE-FOR-CHAIR: start an election with the candidate given on this message, noting that, on receiving all answers, a PREPARED message needs to be sent;
PREPARED: when received by the candidate, pass it on to the impaired chairman. When received by the chairman, this is noted as an answer and as arrival of the trigger to allow proceeding with commit;
COMMIT: start using the candidate as the coordinator. The coordinator candidate will also pass this message on to the non-chairman director, which uses this as the trigger for proceeding with commit;
WHO-IS-COORDINATOR: send back identity of coordinator;
HEARTBEAT: note nodes that have gone down or come up on a particular network. A down node whose answer was expected is dropped from consideration. A newly up node is sent a PREPARE by the appropriate director if an election is in progress;
any other type of message is ignored as erroneous.

After each of the messages has been processed, decision block 834 is reached. If the election process's record of which node is the coordinator is set to UNKNOWN, the decision block 835 is reached. Otherwise, the coordinator is known, and processing returns to block 832.

In decision block 835, a test is made as to whether this node is a director node. This is determined by whether this node is the highest numbered of all of the nodes that either of the heartbeat services 810-1 or 820-1 are reporting as currently up and running. If this node is a director, proceed with decision block 837, otherwise with block 836. For block 836, a message is sent to a director with a message type of WHO-IS-COORDINATOR. Processing then returns to block 832.

A test is made in decision block 837 to see if the candidate record indicates that an election is in progress, in which case proceed to block 839, to continue an election, otherwise start an election in block 838.

To start an election, as in block 838, a candidate is chosen. If both networks 500 and 550 have a quorum, then this is chosen to be the lowest numbered node indicated by both of the heartbeat services 810-1 and 820-1 to be up and running. If the heartbeat services indicate to this director node that only one network has a quorum, then the lowest numbered node up and running on that one network is chosen as the candidate. This choice of candidate is communicated to all nodes known by this director node to be up and running, based on the information given it by the heartbeat services, using a message with a type PREPARE. The director makes a record of which nodes it is sending these messages to, and also notes that no response has yet been received from them. Processing continues with block 832.

Continuing an election, in block 839, is done by sending, to all nodes noted as having been sent a PREPARE message but also noted as not having responded to it, another copy of the PREPARE message. Processing continues with block 832.

An optimization can be performed here to keep both directors from sending messages to the same node. This depends on which director can see which nodes. There are five possibilities:

1. the chairman has direct access to all of the nodes on one network while the non-chairman director has access to some of the nodes on the other network;
2. the chairman has direct access to all of the nodes on one network and that same node is director of the other network;
3. the chairman has direct access to some of the nodes via one network, to others via the other network and, hence, to some of them by both;
4. the chairman has direct access to only some of the nodes and only on one network, while the non-chairman director has access to all up nodes on both networks;

5. neither director has access to all up nodes, since each is only up on a single network.

In case 1 the non-chairman director can tell, from its heartbeat information, that the chairman can see all of the up nodes, so it can leave all of the election work to the chairman. In cases 2 and 3 there is actually only one director. In case 4 the non-chairman director knows which nodes both it and the chairman can see directly, so the non-chairman can restrict itself to talking to those that it knows the chairman cannot talk to. In case 5 neither director knows what is really going on, so both will send to everyone they know. Cases 4 and 5 represent what will be called an impaired chairman, since the chairman does not have access to all of the nodes.

Figure 5:
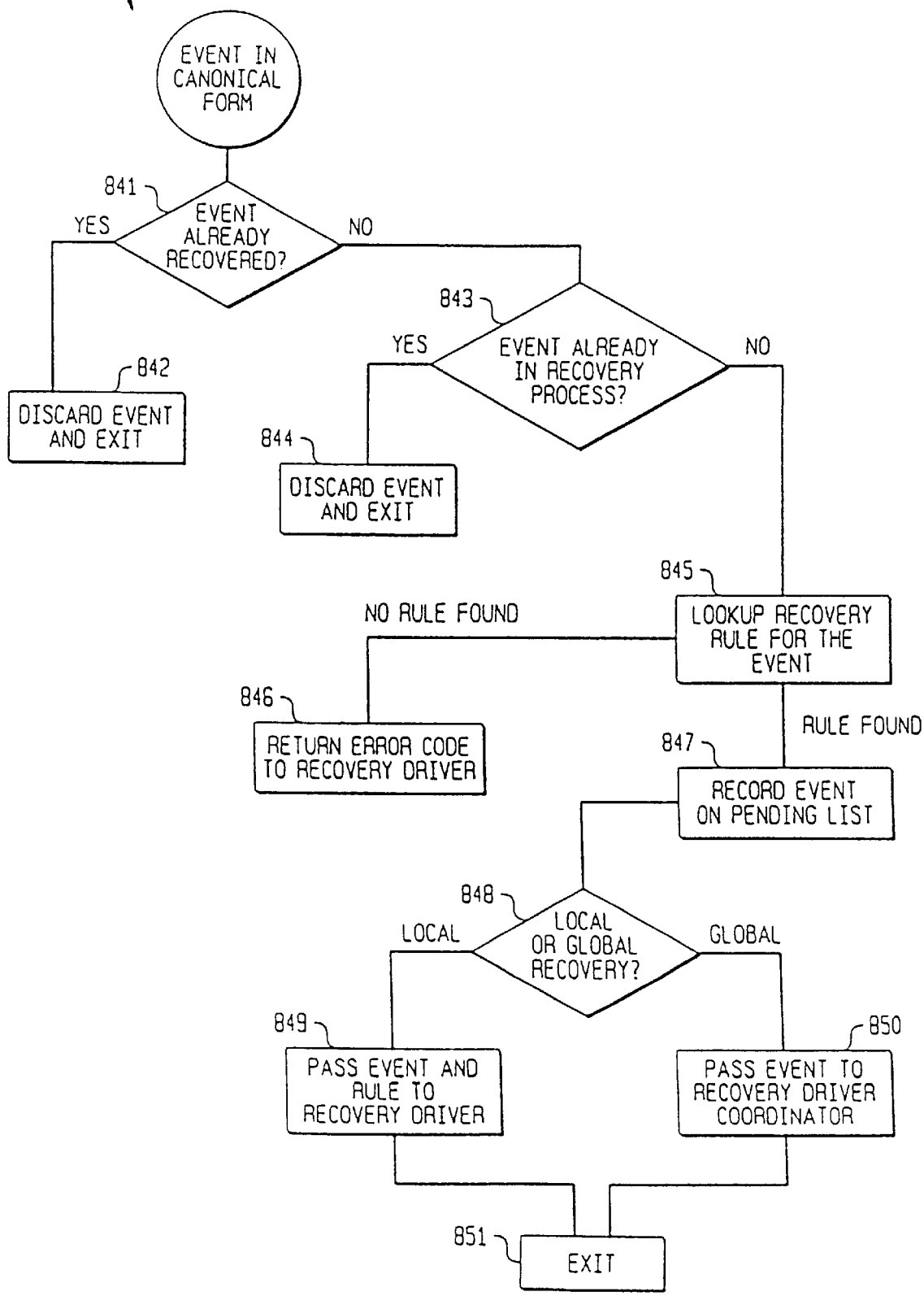
FIG. 5 is a flow chart showing the steps performed by an HAV Event Manager in receiving events from monitors and forwarding them to an HAV Recovery Driver for processing.

FIG. 5 is a block diagram of an event manager instance (840-i). The event manager receives an event, and must first determine whether the event has already been recovered (841). If so, no further processing from the event manager is required, and the event is discarded (842).

If the event has not yet been recovered, the event manager checks whether a recovery process for the event is already in progress—although not yet completed (843). If so, no further processing from the event manager is required, and the event is discarded (844).

If not, the event manager does a lookup to determine whether a rule exists for the "resource type" and "state" pair specified in the event. If no such rule exists, an error condition exists which the event manager reports and then exits (846).

If a rule is found, the event manager records the event on the pending list (so as to deal with the case of a subsequent report of the same event while processing is in progress) (847). The rule is then examined (848) to determine whether recovery will be driven by the recovery driver coordinator (a global event) or whether it can be processed by the recovery driver running on the local node [a local event]. If it is a local event, the event and associated rule are passed to the local recovery driver (900-i) and the event manager exits (851). If it is a global event, the event is passed to the event manager associated with the coordinator recovery driver (850), and the local event manager exits (851).

Figure 6:
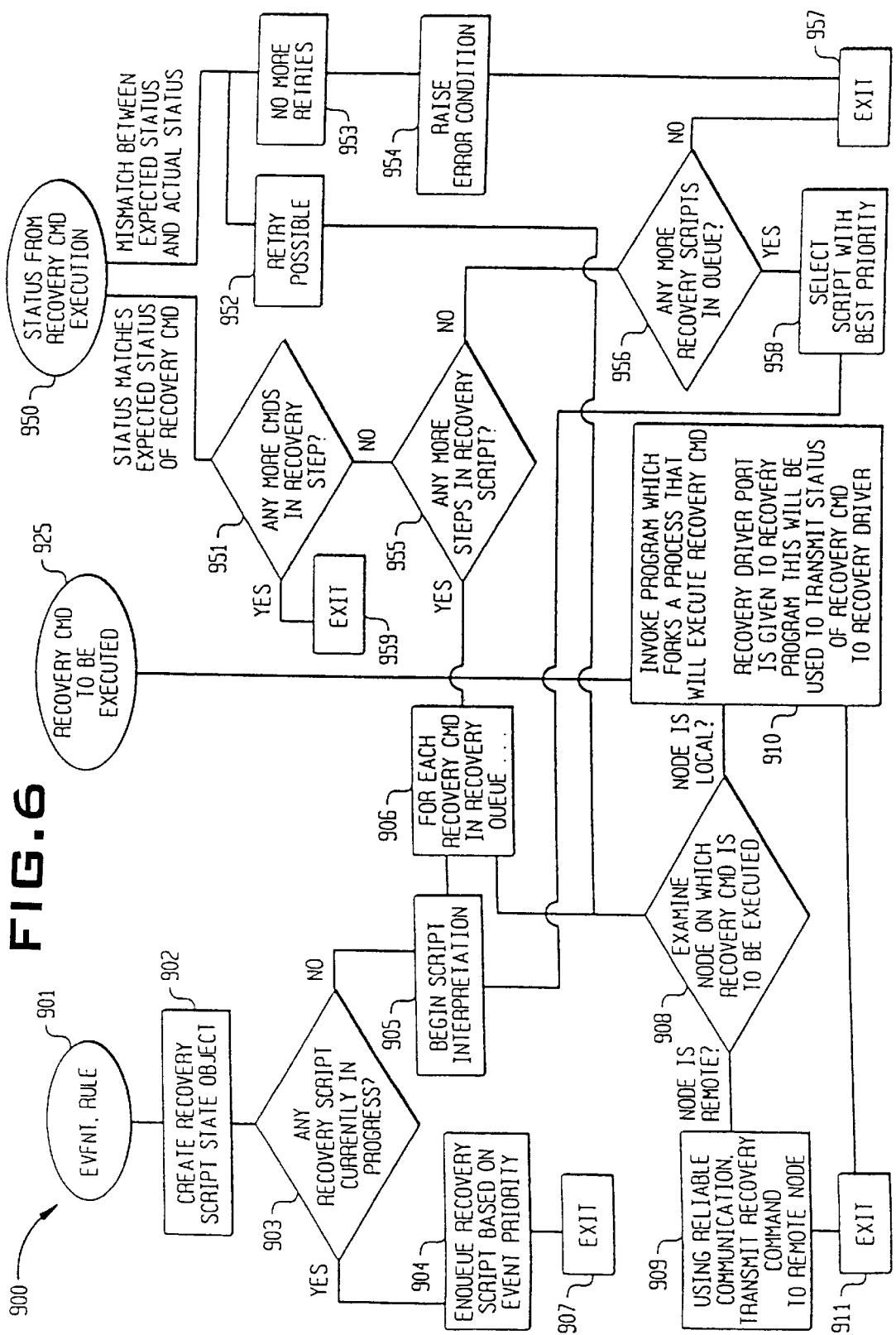
FIG. 6 is a flow chart of the steps performed by an HAV Recovery Driver in initiating recovery procedures, executing recovery programs, and receiving status of recovery command execution; and, FIG. 7 is a diagram showing the internal syntactic structure of an HAV recovery program.

FIG. 6 shows a block diagram of a recovery driver (900-i). There are three principal control paths in this diagram.

In the first control path, a recovery driver receives an event and associated recovery rule (901) from an event manager. This initiates the recovery process for this event, as the recovery driver creates a recovery program object (902) that encapsulates the information associated with the recovery process such as the name of the recovery program, the current position in the program, and the current node membership. The recovery driver then checks whether another recovery program is currently in progress (903). If yes, the recovery driver enqueues the new program (the position in the queue based on the event's priority, specified in the rule) (904) and exits from handling recovery for the event at this time (907). Recovery for this event will then resume when the associated program is selected from the queue (958).

If no other recovery program is currently being executed, the recovery driver immediately begins execution of the new program. The recovery program object exports a queue of recovery commands representing the commands that are to be executed in the program's first step (905). The recovery driver then iterates over the commands in the queue (906), and for each command determines the node on which the command is to be executed (908). If the node is identical to that on which the recovery driver is running, the recovery driver forks a process that runs a generic recovery program which will drive execution of the recovery command (910). The recovery driver then exits (911). If the command is to be executed on another node, the recovery driver transmits it to the specified remote node using HAV's reliable communication facility (830-i) to ensure that it arrives (909), and then exits (911).

In the second control path, the recovery driver is instructed to execute a recovery command (925). This instruction can be issued from the coordinator recovery driver [for a global event] or issued internally if the recovery driver is processing a local event. The recovery driver forks a process that runs a generic recovery program which will drive execution of the recovery command (910), and then exits (911).

In the third control path, the recovery driver receives the status of a recovery command execution (950). It first checks whether the actual status matches the expected status for the command that is specified in the recovery program. If it does not match, the recovery driver checks whether further retries for this command are possible (the original number of retries are specified in the recovery program). If no more retries are possible (953), the recovery driver signals an error condition (954) and exits (957). If another retry is possible (952), the recovery driver determines the node on which the command is to be executed (908). If the node is identical to that on which the recovery driver is running, the recovery driver forks a process that runs a generic recovery program which will drive execution of the recovery command (910). The recovery driver then exits (911). If the command is to be executed on another node, the recovery driver transmits it to the specified remote node using HAV's reliable communication facility (830-i) to ensure that it arrives (909), and then exits (911).

If the actual recovery command status matches the expected status, the program object marks the command as successfully completed and checks whether any further commands in the current recovery step are currently outstanding (951). If at least one command remains in the current step that has not yet completed successfully, the recovery driver exits (959). If no more commands remain in this step, the recovery program object is queried as to whether any more steps remain in the program. If at least one more step remains, the commands in this step are placed in the recovery command queue: the recovery driver then iterates over the commands in the queue (906), and for each command determines the node on which the command is to be executed (908). If the node is identical to that on which the recovery driver is running, the recovery driver forks a process that runs a generic recovery program which will drive execution of the recovery command (910). The recovery driver then exits (911). If the command is to be executed on another node, the recovery driver transmits it to the specified remote node using HAV's reliable communication facility (830-i) to ensure that it arrives (909), and then exits (911).

If no more steps remain in the recovery program, the recovery driver checks whether recovery programs exist in the recovery program queue (956). If yes, the one with the best priority is selected (958), and the recovery driver immediately begins interpreting the program (905). The recovery program object exports a queue of recovery commands representing the commands that are to be executed in the program's first step. The recovery driver then iterates over the commands in the queue (906), and for each command determines the node on which the command is to be executed (908). If the node is identical to that on which the recovery driver is running, the recovery driver forks a process that runs a generic recovery program which will drive execution of the recovery command (910). The recovery driver then exits (911). If the command is to be executed on another node, the recovery driver transmits it to the specified remote node using HAV's reliable communication facility (830-i) to ensure that it arrives (909), and then exits (911). If no recovery program exists in the queue, the recovery driver simply exits (959).

Figure 4:
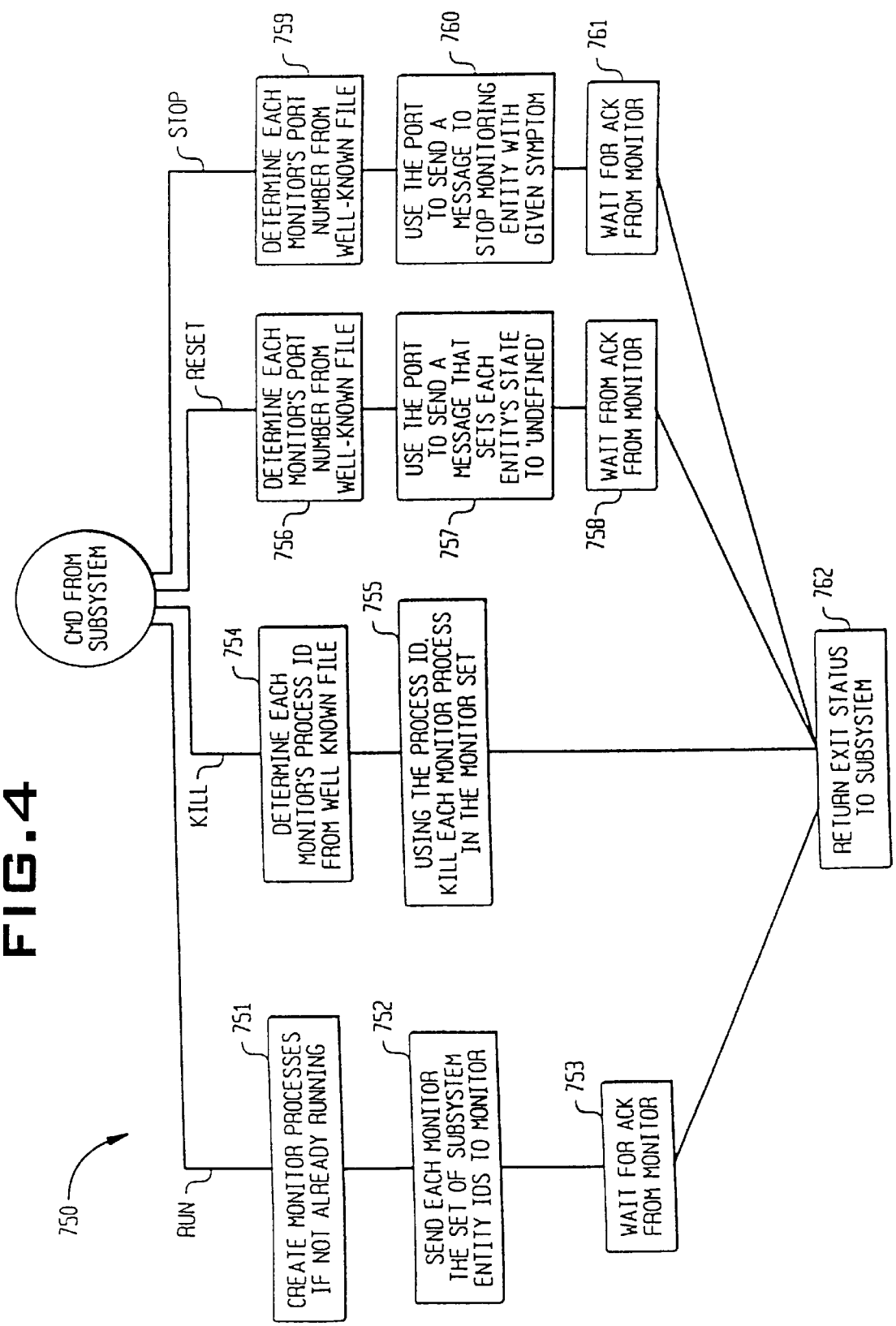
FIG. 4 is a flow chart showing an HAV Subsystem Controller that provides the glue between individual subsystems and monitors that report events to HAV event managers.

FIG. 4 is a block diagram of an instance of a subsystem controller (710-k-i). This function relates to the diagram in FIG. 1, in which a subsystem controller instance (750-k-i), running on node 100-i, is the interface between a subsystem instance (600-k-i) and the subsystem instance's monitor(s) (700-k-i).

Subsystem controllers provide the interface for incorporating a non-HA subsystem into the HA infrastructure since they control the subsystem's monitors which report events to the event managers (840-i) in FIG. 2 and, in turn, drive the recovery driver's (900i) recovery actions.

When a subsystem starts an instance, it must ensure that a monitor will be informed so that it can monitor the instance's health. This is done through a "run" command to the subsystem controller which: creates a monitor process tailored to this subsystem if one does not already exist (751), transmits the entity id that the monitor will use to perform the monitoring task (752), and waits for an acknowledgement that the monitor received this information (753) before exiting (762).

Conversely, when a subsystem instance is being proactively stopped, it must issue a "stop" command to the subsystem controller. (Otherwise, the monitor will report the stopped instance as a detected failure). The subsystem controller determines the communication port used by the monitor through a file lookup (759), informs the monitor which entity id should no longer be monitored (760), and waits for an acknowledgement that the monitor received this information (761) before exiting (762).

Subsystems also need the ability to cause a monitor to give a new report about the state of a given entity—even if, from the monitor's viewpoint, there has been no change in the entity's state which warrants a report. This is done through issuing a "reset" command to the subsystem controller which determines the communication port used by the monitor through a file lookup (756), informs the monitor about the id of the entity whose state should be reinitialized (757), and waits for an acknowledgement that the monitor received this information (758) before exiting (762).

If a subsystem is being shut down on a given node, it issues a "kill" command to the subsystem controller which determines the process id of the monitor process through a file lookup (754), using the process id, kills the specified process (755), and exits (762).

FIG. 7 shows the internal structure of an HAV recovery program 980 executed by the recovery driver 900-i. It includes a sequence of steps (981-i)—in this case, two steps (981-1) and (981-2)—that, together, comprise the recovery program (980).

A recovery step includes a set of recovery commands (983-i, 1<=i<=n): it begins with either the first command in the recovery program or the first command after a barrier command (982), and ends with either the last command in the program or the last recovery command before a barrier command. All recovery commands in a recovery step may be executed in parallel; execution of a command belonging to step n+1 cannot begin before all commands in step n have completed successfully.

A recovery command (983-i) includes five specifications, (984, 985, 986, 987, 988).

A recovery node set specification (984) denotes the set of nodes on which the command should execute. This specification can be made in terms of higher level constructs such as "all nodes", "all nodes in a given subsystem", "the coordinator node", or a "designated spare node". The recovery node set specification is expanded in macro fashion to the designated set of nodes.

A command specification (985) denotes the command to be executed. The command specification is in the form of a path to a script, program or other executable file.

The expected status (986) is the status that must be returned as a result of executing the command (985) in order for the command to be considered to have executed successfully.

The information file (987) is a file containing information that is used to expand the recovery node specification (984), e.g., a list of nodes on which a given subsystem runs.

The number of retries specification (988) denotes the maximum number of times that the command will be executed if the command does not execute successfully.

Now that the invention has been described by way of the preferred embodiment, various modifications and improvements will occur to those of skill in the art. Thus, it should be understood that the preferred embodiment has been provided as an example and not as a limitation. The scope of the invention is defined by the appended claims.

We claim:

1. A method for monitoring and recovery of subsystems in a distributed computer system comprising the steps of:
   (a) executing a distributed software subsystem on the distributed system, said software subsystem not being self-recoverable from failure events;
   (b) providing user-defined monitors for the software subsystem, each of the user-defined monitors including a set of user defined events to be detected; and,
   (c) responsive to an occurrence of one of the events, performing recovery actions coordinated among the nodes of the distributed computer system as controlled by a user specified recovery program.

2. The method of claim 1 comprising the further steps of: distributed system comprising further steps of:
   (d) detecting a failure of an element of a distributed recovery manager executing the distributed recovery program;
   (e) responsive to detection of the failure, coordinating among remaining elements of the distributed recovery manager to handle completion of ongoing recovery actions;
   (f) determining the current state of the distributed system; and,
   (g) based on a comparison of the current state of the distributed system and the user specified events detected in step (b) determining any additional recovery actions to be taken.

3. A method for operating a distributed system comprising the steps of:
   executing a set of interdependent software subsystems run on nodes of the distributed system, each of said software subsystems not being self-recoverable from failure events;
   providing a user-defined set of monitors that probe the health of each subsystem and report failure events;
   providing a user-defined recovery program for each of a plurality of the failure events; and,
   using the user-defined recovery program, coordinating and synchronizing the recovery of the interdependent software subsystems.

4. The method of claim 3 wherein each of the software subsystems is embodied as a set of program instances with one or more program instances running on each node in the distributed system.

5. The method of claim 3 wherein the failure events are reported to an event manager and wherein the event manager reports only selected ones of the events based on a filtering criteria.

6. The method of claim 3 wherein the user defined recovery program is selected based on a set of rules provided by a user.

7. A method of providing error recovery in a distributed system, comprising the steps of:

> monitoring computing nodes of the distributed system using at least one heartbeat and membership protocol,
>
> monitoring for subsystems running on the computing nodes using user defined monitors, at least one of said subsystems not being self-recoverable from failure events;
>
> reporting events detected by the user-defined monitors to at least one event handler;
>
> filtering the events in the event handler so as to provide filtered events;
>
> applying a set of rules to the filtered events to select a user-defined recovery program from a set of user-defined recovery programs; and,
>
> coordinating among the nodes in the distributed system to execute a selected recovery program.

8. The method of claim 7 wherein the filtering includes at least one of event correlation, removal of duplicate events, and rollup.

9. The method of claim 7 wherein the user-defined recovery programs comprise recovery steps which specify a set of nodes on which the recovery programs run, an action to be performed, a maximum time that the action can take, actions to be taken in the event that a recovery step fails, parameters required for the recovery step and which sets of recovery steps can be carried out in parallel.

10. The method of claim 9 comprising the further step of interspersing recovery steps by way of user-defined barrier commands that require that all the prior recovery steps be completed before proceeding beyond a barrier.

11. A system for providing error recovery in a distributed system, comprising:

> a plurality of monitors in computing nodes of the distributed system using at least one heartbeat and membership protocol,
>
> a plurality of user-defined monitors for subsystems running on the computing nodes, the monitors including means for detecting events and sending reports of said events to event handlers, at least one of said subsystems not being self-recoverable from failure events;
>
> means for processing events, in the event handlers, by filtering the events by way of activities such as event correlation, removal of duplicate events, and rollup;
>
> means providing filtered events to recovery drivers, which have a rule base which specify user-defined recovery programs corresponding to events; and,
>
> means for coordinating among the nodes in the distributed system to execute the recovery program.

12. The system of claim 11 wherein the recovery programs comprise recovery steps which specify the set of nodes on which they run, an action to be performed, a maximum time that the action can take, actions to be taken in the event that the recovery step fails, and parameters required for the recovery step and which sets of recovery steps can be carried out in parallel.

\* \* \* \* \*